United States Patent [19]
James

[11] Patent Number: 6,032,458
[45] Date of Patent: Mar. 7, 2000

[54] TURBINE POWERPLANT HAVING ROTORS WITH CONCENTRIC ROWS OF IMPELLER BLADES

[76] Inventor: Robert G. James, 2713 Vyn Dr., Bakersfield, Calif. 93306

[21] Appl. No.: 08/957,015

[22] Filed: Oct. 24, 1997

[51] Int. Cl.[7] ....................................................... F02C 3/14
[52] U.S. Cl. ........................ 60/39.35; 60/39.43; 60/39.75
[58] Field of Search .............................. 60/39.34, 39.35, 60/39.43, 39.75

[56] References Cited

U.S. PATENT DOCUMENTS

| | | | |
|---|---|---|---|
| 3,015,211 | 1/1962 | Luttrell | 60/39.75 |
| 5,263,313 | 11/1993 | Chow | 60/39.43 |

FOREIGN PATENT DOCUMENTS

| | | | |
|---|---|---|---|
| 820337 | 9/1959 | United Kingdom | 60/39.35 |

Primary Examiner—Charles G. Freay
Attorney, Agent, or Firm—I. Michael Bak-Boychuk

[57] ABSTRACT

A turbocompressor assembly includes a first rotor stage mounted on a rotary shaft and including circular rows of impeller blades on one surface thereof separated by radial gaps in which opposed blade rows on a second rotor stage are received. The two rotor stages are geared for counter-rotation and at least one of the rotors is perforated proximate its center to allow air to be drawn between the opposed surfaces thereof, where its passage over the impeller blades develops useful torque. The opposed rotor surfaces are convolved to define a radially decreasing separation to an annular combustion cavity, and thereafter increasing with radius. Thus a radial compressor and a turbine function are developed by the respective blade rows on either side of the combustion cavity. The combustion cavity may be formed in one of the rotors, or may be shared between the rotors as a communicating common annular chamber. Fuel may be delivered to the combustion chamber directly admixed into the air stream, or by a fuel delivery system.

14 Claims, 3 Drawing Sheets

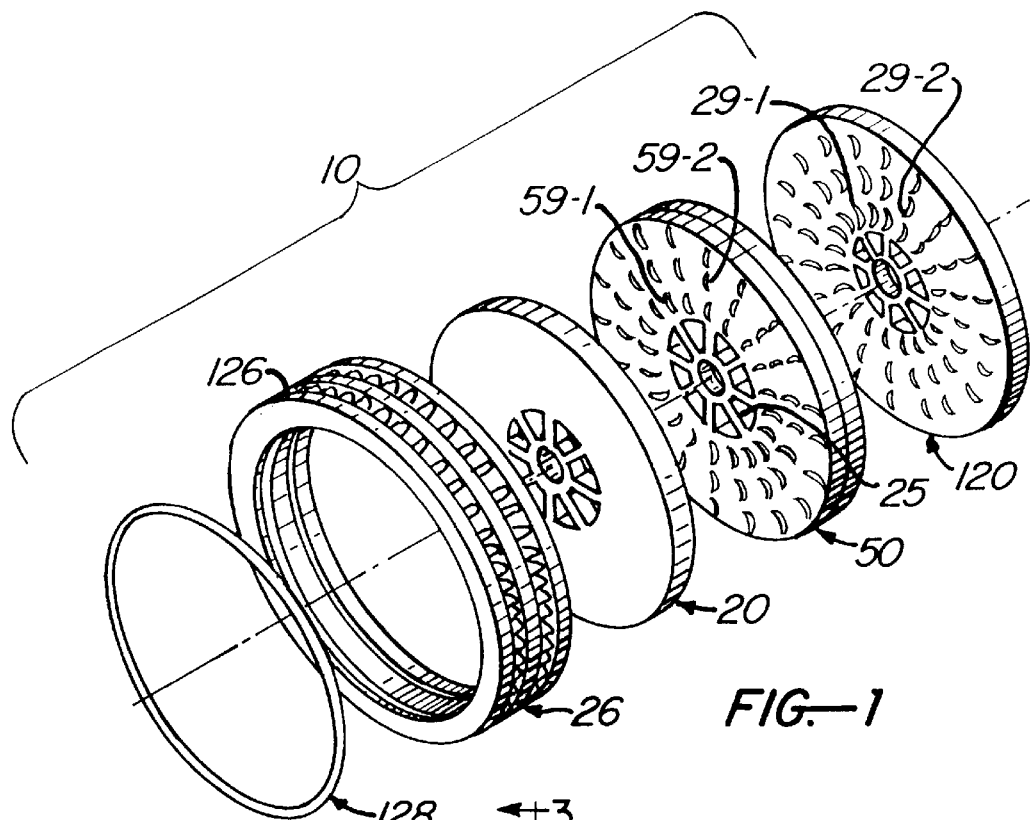
FIG.—1
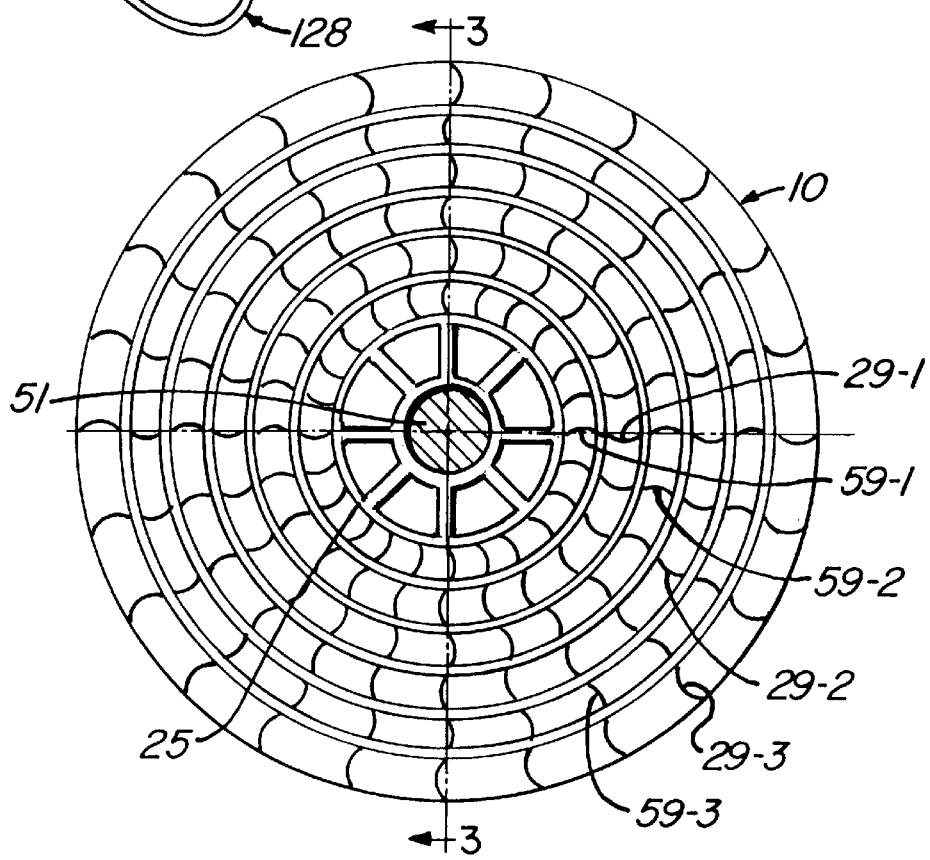
FIG.—2

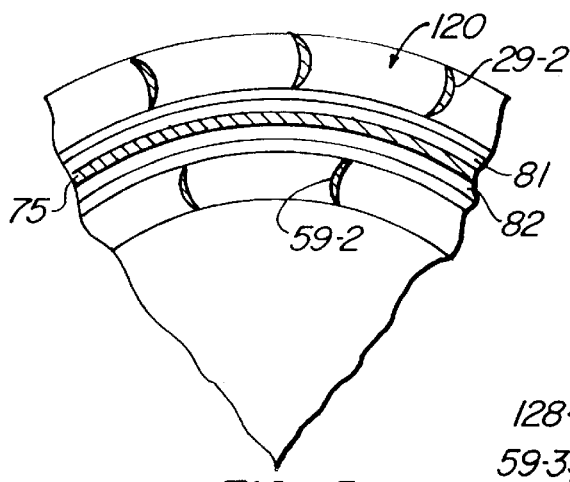
FIG.—5
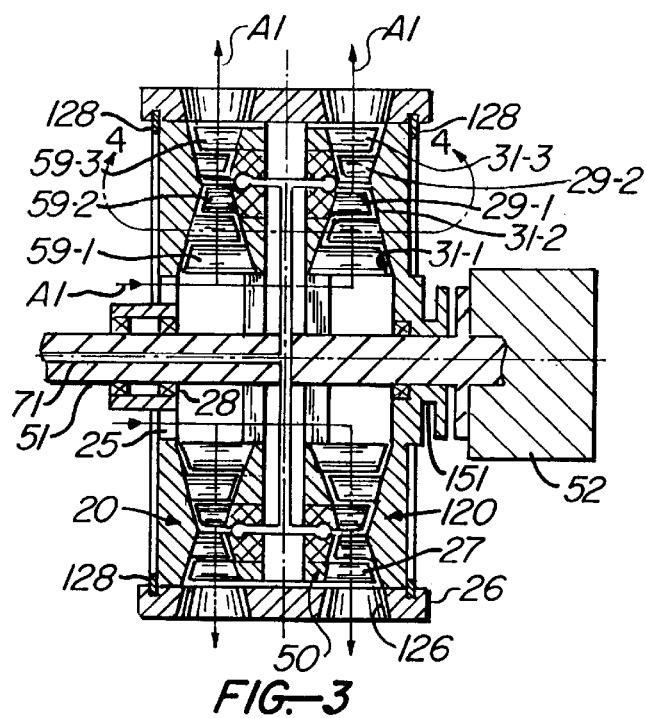
FIG.—3
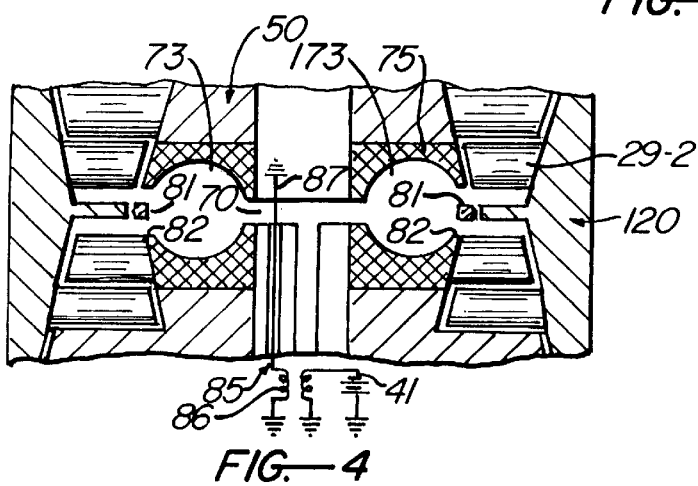
FIG.—4

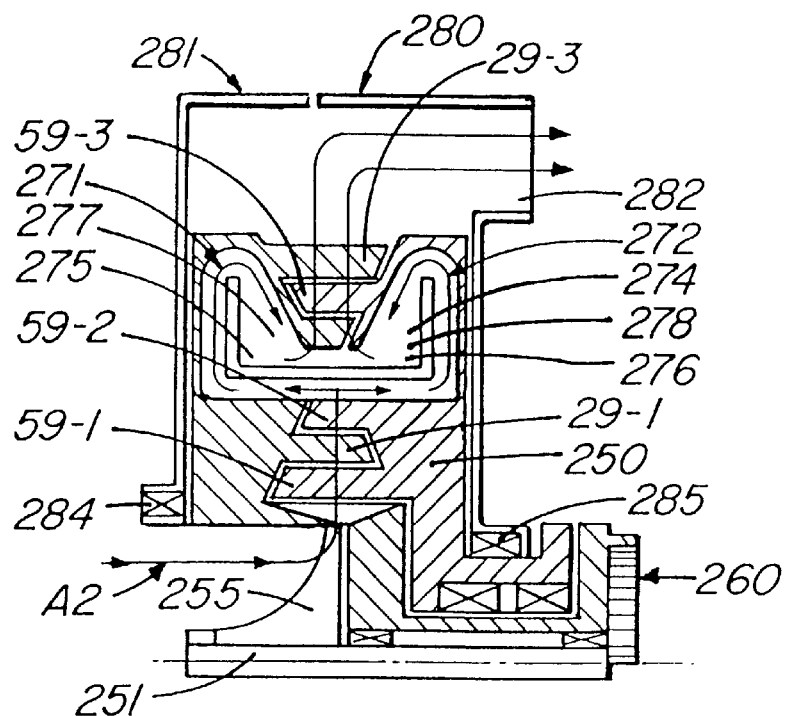
FIG.—6
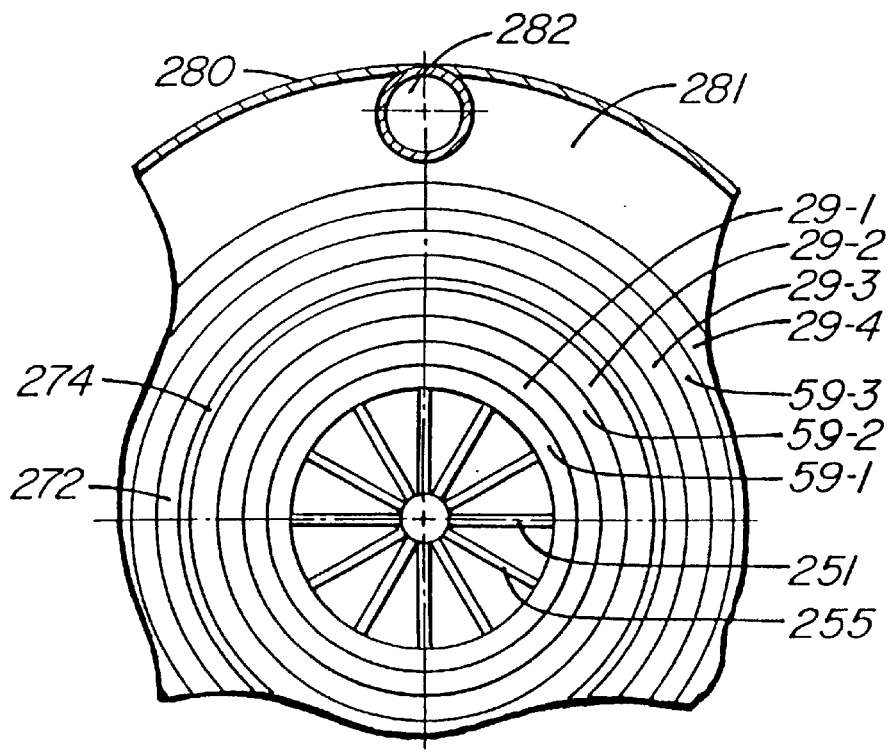
FIG.—7

TURBINE POWERPLANT HAVING ROTORS WITH CONCENTRIC ROWS OF IMPELLER BLADES

BACKGROUND OF THE INVENTION

1. Field of the Invention

The present invention relates to gas turbine power plants, and more particularly to gas turbines of the compressor-combustor-turbine configuration conformed for minimal geometry.

2. Description of the Prior Art

The use of of a turbocompressor cycle to generate power has been extensively practiced in the past, and the modern jet engine is one illustrative example thereof. The cycle, sometimes referred to as the Brayton cycle, is characterised by adiabatic compression, constant pressure heating and thereafter adiabatic expansion of the heated, compressed gas that includes the heat of combustion. The net power output is then realised through a turbine driven by the expanding gas, and the power plant is therefore known as a gas turbine power plant.

The theoretical cycle efficiency of the Brayton cycle is defined as a ratio of the net energy in excess of that required for compression, divided by the energy added during combustion. Stated otherwise, the thermal efficiency of the cycle is determined mainly by the compressor pressure ratio and the turbine inlet temperature, and it is these two parameters that govern the design of the power plant. Of these two the implementation of the compressor has followed various combinations of two basic physical paths, those obtaining compression by centrifugal effects and those compressing gas through axial stages. Thus the generic types of compressor assembly are known as centrifugal, axial or mixed configurations.

Turbine inlet temperature, in turn, is ultimately a function of material selection and cooling design. While this aspect presents the more formidable engineering task, the inherent limits of a stationary combustion chamber result in pressure-to-temperature exchange and the losses incident thereto. The same centrifugal placement of combustors greatly simplifies the over-all structure since the combustor may form one part of a rotary device. The compressor, combustor and turbine may thus form an integral structure.

In this manner design simplicity can therefore be obtained by conserving the centrifugal pressure in the combustor, and it is one such configuration that is disclosed herein. The same centrifugal placements of combustors allow for further simplification in the design, obtaining packing convenience associated therewith and the incident reduction in mass and complexity. Thus several advantages are obtained, resulting in a power plant that is simple in design, convenient in fabrication and reliable in use.

SUMMARY OF THE INVENTION

Accordingly, it is the general purpose and object of the present invention to provide a turbocompressor power plant including centrifugal combustors.

Other objects of the invention are to provide a turbocompressor power plant of a generally radial configuration including a centrifugal placement of the combustion elements thereof.

Further objects of the invention are to provide a gas turbine power plant in which the compressor, turbine and combusor elements are part of a single rotary structure.

Yet other objects are to provide a gas turbine engine in which the compressor, combustor and turbine are formed in a complementary, and counter-rotating set of radial structures.

Briefly, these and other objects are accomplished within the present invention by providing a generally circular first rotor assembly sandwiched between a pair of concentric second rotor assemblies, both the first and second assemblies mounted for counter-rotation. The first assembly may be provided with an annular combustion plenum fed the combustion charge by transferring through radial ports the air flow between the first and second assemblies. In one implementation this air charge is mixed with fuel conveyed directly to the annular plenum by a fuel feed circuit, and in a second example the air and fuel are mixed at the inlet to the power plant. In both instances the combustion is confined to the annular plenum by ignition devices, pressure drop and ignition temperature. Thus the highest thermal stresses are confined and localised for convenient accommodation by selected high temperature material inserts.

Both the first and second rotor assemblies are provided with radially interleaved vanes or blades defining a decreasing intake compressor cavity therebetween, up to the radial dimension of the combustion plenum, and thereafter an increasing discharge cavity to exhaust ports vented to the surroundings. In this manner the interleaved blade set interior of the combustion annulus provides the function of the compressor, while the blade sets exterior of the combustion plenum form the turbine function. Since the first blade rank adjacent the combustor outlet will see the highest temperatures, the combustion plenum and the first turbine blade rank may be formed of a high temperature material insert, like a ceramic material. The structure, therefore, may be made mostly of inexpensive material, like aluminium, with only those portions exposed to extreme thermal stresses formed at high cost.

While the foregoing assembly is symmetrical about the center rotor assembly, an alternative implementation illustrates a combustor distributed in the opposed faces of a mated pair of rotors. Similar to the foregoing operation, the inner blade ranks form the compressor while those radially distal of the burner cavity form the turbine.

BRIEF DESCRIPTION OF THE DRAWINGS

FIG. 1 is a perspective illustration, separated by parts, of the inventive gas turbine engine;

FIG. 2 is a plan view of the inventive gas turbine engine shown in FIG. 1, illustrating the radial interleaving of counter-rotating rows of blades for providing both the compressor and turbine functions;

FIG. 3 is a side view, in section, taken along line 3—3 of FIG. 2;

FIG. 4 is detail view, in partial section, of an annular combustion plenum useful with the present invention;

FIG. 5 is yet another detail view, in partial section, of the plenum shown in FIG. 4, illustrating the exit porting thereof;

FIG. 6 is yet another side view, in section, illustrating an alternative implementation of the inventive gas turbine engine; and FIG. 7 is a partial front view section of the implementation shown in FIG. 6.

DESCRIPTION OF THE PREFERRED EMBODIMENTS

As shown in FIGS. 1 through 5, the inventive gas turbine engine, generally designated by the numeral 10, comprises a first rotor assembly 50 positioned between a set of coaxial second rotor assemblies, generally shown as the front rotor assembly 20 and a rear rotor assembly 120. Assembly 50 is mounted on a shaft 51 geared for counter-rotation by a gearhead 52 to a surrounding sleeve 151 on which rotor 120 is mounted. Thus as rotor 50 is turned a concurrent opposite rotation occurs in rotor 120. A circular exterior sleeve 26 extends across the peripheries of rotors 20 and 120, thus locking rotor 20 to the rotation of rotor 120, rotor 20 being supported on a bearing 28 mounted on shaft 51.

Thus both the front rotor 20 and the first rotor assembly 50 are mounted on the shaft 51. This mounting is effected by corresponding spiders 55 and 25 to allow for air passage therethrough. Accordingly both the interspaces between rotor 20 and assembly 50, and assembly 50 and rotor 120, are ventilated along the axis of rotation.

The opposed faces between the respective rotors and assembly 50, shown as face 27 on rotors 20 and 120, like numbered parts functioning in a like manner, are each provided with a set of radial ribs extending from the mounting spiders 25 to the rotor periphery. Each of the generally radial ribs extends in radial segments to an enlarged vane shown as vane segments 29-1 and 29-2. Accordingly, concentric vane or blade rings are formed, interspaced by substantially equal radial gaps 31-1, 31-2 and 31-3. These radial gaps are the aligned to receive corresponding vane rings 59-1, 59-2 and 59-3 formed on faces 57 on the rotor assembly 50. Accordingly, a generally radial sequence of interleaved vane segments is formed on the counter-rotating surfaces, drawing air, shown by arrows A1, at the center and advancing it centrifugally to the periphery. This transfer path is shaped by the relative inclinations of the opposed faces 27 and 57 to form a radially reducing volume including vane segments 29-1, 59-1 and 59-2. These vane segments, therefore, form the compressor stage of the turbocompressor assembly. In a similar manner vane rings 29-2 and 59-3 on their respective surface portions define the expanding volume of a turbine stage.

Between these radially contracting and thereafter expanding volumes is the minimal separation strip, defining the thickest sectional segment in rotors 50, 20 and 120. This enlarged sectional volume allows for an annular combustion plenum 70 within rotor 50 into which fuel may be conveyed by a delivery system 71. The combustion plenum 70 may be formed in an annular insert 75 of a high temperature material structure, such as ceramic, forming a circular segment of the rotor assembly 50. In radial section plenum 70 may be divided into a front and rear chamber 73 and 173 each fed with a set of inlet channels 81 and outlet channels 82 formed in the insert structure 75. Channels 81 and 82 may be inclined relative the adjacent ranks of vanes 59-2 and 29-2 to an alignment optimised for the operating conditions of the engine 10, and channels 82 may be expanded and extended to a sufficient length to meet the thermal constraints of the first turbine set of blades. In this manner all the design limitations can be accomodated, including the thermal limitations of the materials selected and the thermal efficiency of the device.

The charge delivered to the plenum 70 may be ignited by a set of magnetos 85 each provided with an induction coil 86 and a spark plug 87. A corresponding set of magnetic slugs 41 may be imbedded in the opposed surfaces of the rotors 20 and 120 to provide the flux for magnetic induction. Thus the combustion in plenum 70 is sustained by the rotary advancement of the engine. At the same time the exterior shell 26, provided with radial openings 126, centrifugally extracts the products of combustion through the turbine stage, while also providing the retention, by snap rings 128, of the whole assembly.

Those in the art will appreciate that the delivery of fuel to the plenum through conveyances 71 can be omitted for those design configurations in which ignition is not possible ahead of the plenum. In these design selections the fuel mey be simply atomized into the air stream A1 and carried along with the flow (not shown). That portion of the charge that then by-passes the plenum 70 will merge with the hot exhaust gases in the turbine section, increasing the power derived thereat. It is this containing aspect of the foregoing assembly that also limits the majority of losses that are usually associated with devices of this kind.

In the foregoing implementation rotors 20 and 120 are deployed symmetrically on either side of assembly 50, thus providing load distributions that minimize shaft stresses. This favorable load arrangement is particularly useful in low-cost applications where the redundant ignition arrangement in plenum 70 enhances the reliability of operation. Moreover, the radial sequencing of the compressor stage, the combustor, with the turbine on the exterior ranks, also confines the losses. Thus the configuration is particularly suited for low cost fabrication.

Further structural simplification may be achieved in the implementations illustrated in FIGS. 6 and 7. Like numbered parts functioning in a like manner, a rotor assembly 220 is conformed to include a central impeller 255 mounted on shaft 251 geared through a planetary gearhead 260 to drive in counter-rotation the rotor assembly 220 and a mating rotor assembly 250. Inlet air is drawn along arrows A2 by the impeller 255 into the interspace between the rotor assemblies, again provided with blade rings 29-1 interlaced between rings 59-1 and 59-2 to form the compressor function. Blade rings 29-2 and 29-3 spaced adjacent blade ring 59-3 then form the turbine.

In this example the combustor is formed in two opposed annular cavity halves 271 and 272 respectively in the opposed faces of rotor assembly 220 and 250 between the compressor and turbine blade sets. Each cavity half includes a portion of a diffuser ring 273 and 274 which together extend across the common cavity, to diffuse the air flow A2 coming from the compressor and direct it into combustion chambers 275 and 276 in which ignition rings 277 and 278 are positioned. From there, the ignited gases are then conveyed to the turbine blade sets.

An exhaust housing 280 surrounds mated rotor assemblies to provide an annular exhaust chamber 281 communicating to the outside through exhaust ports 282. Housing 280 is engaged across bearings 284 and 285 to the rotors 220 and 250 respectively. In this manner the mated rotors 220 and 250 are retained in the housing, producing between their common interfaces an inexpensive and reliable gas turbine power plant.

Those in the art will appreciate that the over-all efficiency of a gas turbine engine is determined by the pressure ratio across the compressor. Thus the inclusion of an impeller 255 in stead of the central spiders produces beneficial results without the associated weight and complexity normally found.

At the same time, the rotary arrangement of the combustion chamber increases combustion pressures, and therefore combustion temperatures, once more increasing efficiency. Between these combined effects, a simple, inexpensive and reliable power source is provided which may be adapted to various applications.

Obviously, many modifications and variations may be effected without departing from the spirit of the above teachings. It is therefore intended that the scope of the invention be determined solely by the claims appended hereto.

I claim:

1. A turbocompressor assembly, comprising:

a first generally circular rotor mounted on a first rotary mount, said first rotor including a first surface provided with first concentric rows of impeller blades;

a second generally circular rotor mounted on a second rotary mount, said second rotor including a second surface provided with second concentric rows of impeller blades, wherein said second surface is opposed to said first surface to extend said second concentric rows between said first concentric rows and said first mount is deployed for rotation in concentric relationship with said second mount;

a generally annular combustion cavity formed in said second rotor between selected ones of said second rows;

counterrotation means connected between said first and said second rotary mount, for gearing said second mount for rotation opposite to the rotation of said first mount;

fuel delivery means connected to said annular combustion cavity for delivering fuel thereto; and ignition means installed in said annular combustion cavity for igniting said fuel.

2. Apparatus according to claim 1, wherein:

said first rotor includes a generally central aperture for drawing air into the interspace between said first and second surfaces.

3. Apparatus according to claim 2, wherein:

said first and second surfaces are shaped to define the smallest separation therebetween proximate said annular cavity; and said first and second rows each include corresponding blades generally of a dimension defined by said separation between said first and second surfaces.

4. Apparatus according to claim 3, wherein:

said ignition means includes an electric spark generator.

5. Apparatus according to claim 2, wherein:

said aperture includes said fuel delivery means.

6. A gas turbine power plant comprising:

a first generally circular rotor mounted on a first rotary mount, said first rotor including a first surface provided with first concentric rows of impeller blades;

a second generally circular rotor mounted on a second rotary mount, said second rotor including a second surface provided with second concentric rows of impeller blades, wherein said second surface is opposed to said first surface to extend said second concentric rows between said first concentric rows and said first mount is deployed for rotation in concentric relationship with said second mount;

a generally annular combustion cavity formed in said second rotor between selected ones of said second rows; and counterrotation means connected between said first and said second rotary mount, for gearing said second mount for rotation opposite to the rotation of said first mount.

7. A gas turbine power plant, according to claim 6, further comprising:

fuel delivery means connected to said annular combustion cavity for delivering fuel thereto.

8. A gas turbine power plant, according to claim 7, further comprising:

ignition means installed in said annular combustion cavity for igniting said fuel.

9. Apparatus according to Claim 8, wherein:

said first rotor includes a generally central aperture for drawing air into the interspace between said first and second surfaces.

10. Apparatus according to claim 9, wherein:

said first and second surfaces are shaped to define the smallest separation therebetween proximate said annular cavity; and said first and second rows each include corresponding blades generally of a dimension defined by said separation between said first and second surfaces.

11. Apparatus according to claim 10, wherein:

said ignition means includes an electric spark generator; and said aperture includes said fuel delivery means.

12. A turbocompressor assembly comprising:

a first generally circular rotor mounted on a first rotary mount, said first rotor including a first surface provided with first concentric rows of impeller blades;

a second generally circular rotor mounted on a second rotary mount, said second rotor including a second surface provided with second concentric rows of impeller blades, wherein said second surface is opposed to said first surface to extend said second concentric rows between said first concentric rows and said first mount is deployed for rotation in concentric relationship with said second mount;

a generally annular first combustion chamber formed in said first rotor between selected ones of said first rows;

a generally annular second combustion cavity formed in said second rotor between selected ones of said second rows in opposed alignment relative said first chamber;

counterrotation means connected between said first and second rotary mount, for gearing said second mount for rotation opposite to the rotation of said first mount;

fuel delivery means connected to said annular combustion cavities for delivering fuel thereto; and ignition means installed in said annular combustion cavities for igniting said fuel.

13. Apparatus according to claim 12, further comprising:

diffuser means mounted in the common interior of said first and second chamber.

14. Apparatus according to claim 13, wherein:

said first rotor includes a generally central aperture for drawing air into the interspace between said first and second surfaces;

said first and second surfaces are shaped to define the smallest separation therebetween proximate said annular cavity; and said first and second rows each include corresponding blades generally of a dimension defined by said separation between said first and second surfaces.

* * * * *